Aug. 8, 1933.   G. H. PEGRAM   1,921,428
AIRCRAFT STRUCTURE
Filed Aug. 21, 1929
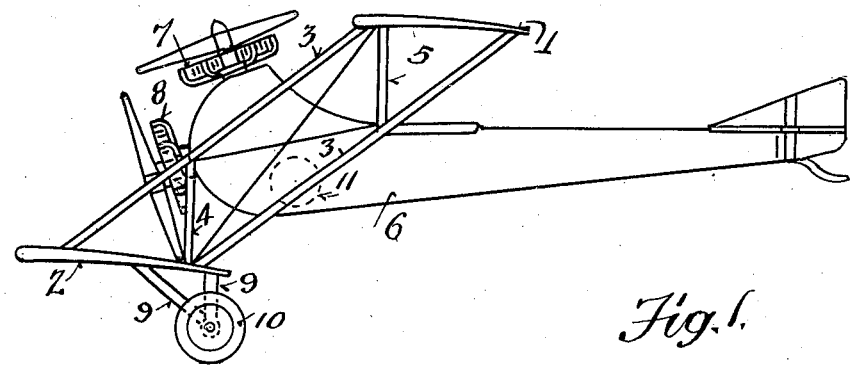
Fig. 1.
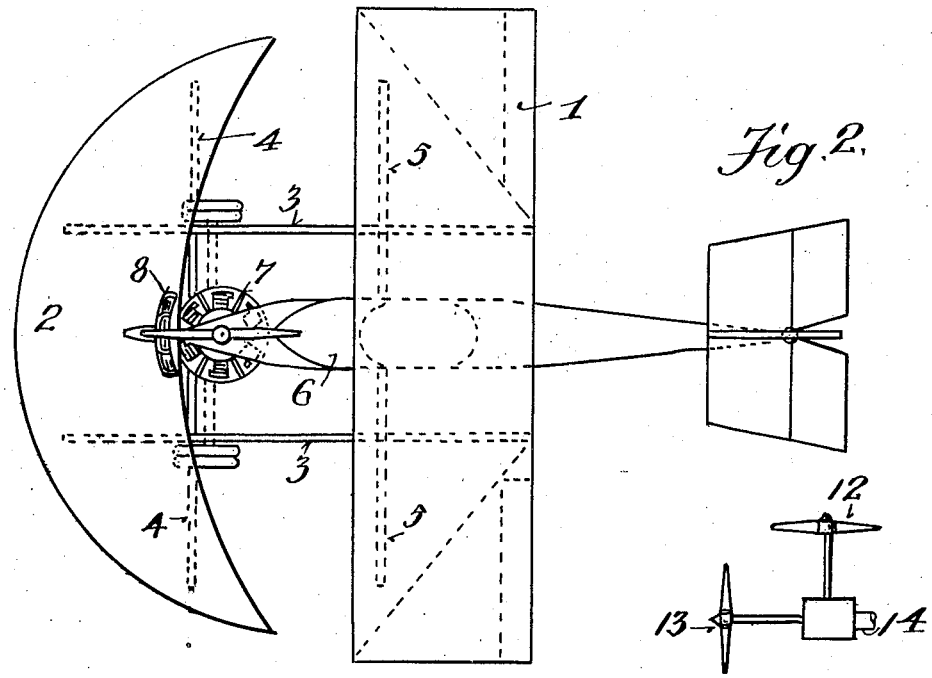
Fig. 2.
Fig. 4.
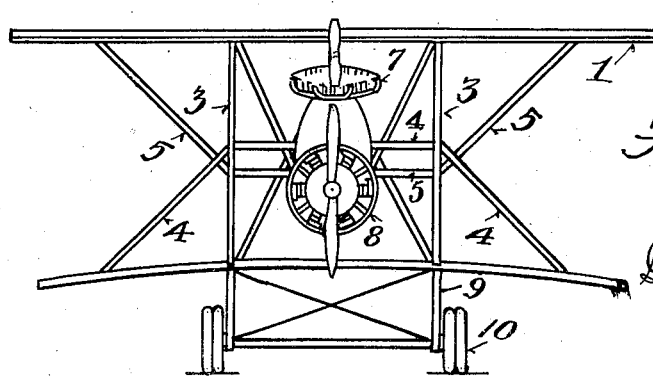
Fig. 3.
INVENTOR
George H. Pegram
BY Darby + Darby
his ATTORNEYS Patented Aug. 8, 1933

1,921,428

UNITED STATES PATENT OFFICE 1,921,428

AIRCRAFT STRUCTURE

George H. Pegram, South Orange, N. J.

Application August 21, 1929. Serial No. 387,286

17 Claims. (Cl. 244—14)

This invention relates to aircrafts and with particularity to methods and means for applying motive power to such structures and for controlling the direction of flight.

Heretofore the lift of an airplane, hydroplane or the like has been accomplished by utilizing the air pressure on the wings, induced by the forward motion of the airplane, which wings are usually cambered for this purpose. Because of this feature it is necessary, in order to achieve the proper take-off or landing, that the craft be subject to a relatively long run and likewise for any given wing structure there is a certain limiting speed necessary to maintain the requisite lift during flight. Accordingly it is one of the principal objects of the invention to provide an airplane, hydroplane, or the like with means whereby the length of run required for the take-off or landing is materially reduced.

Another object of the invention is to provide means whereby an airplane, hydroplane, or the like may be flown at a much lower speed than is practical with existing structures thus enabling the machine to be used advantageously for reconnoitering work, aerial photography, etc.

A feature of the invention resides in a propeller structure for aircraft whereby the rotation of the propeller directly accomplishes lifting in a substantial part.

Another feature of the invention relates to the means for materially controlling the lift independently of the forward speed of the aircraft.

Another feature relates to an aircraft structure wherein the lift may be varied within wide limits without unduly prejudicing the stability of the machine in flight.

A further feature of the invention relates to the provision of a structure adapted to have the air streams from the propeller operate to relieve the pressure on the top of the wings and in conjunction therewith to increase the pressure of the bottom of the wings.

Another feature of the invention is the provision of a propeller structure adapted to exert a positive lift on the airplane in such a way that the lifting effort can be changed to an upward, forward, or downward effort by varying the resultant effort of two or more independently operable propellers.

A further feature of the invention also resides in the arrangement and organization of elements which go to make up an efficient and readily controlled aircraft.

The invention, as disclosed, is capable of application to all kinds of propelled aircraft and is particularly useful and advantageous as applied to a hydroplane structure inasmuch as hydroplanes are required to alight and take-off within relatively short distances, particularly on rough waters. While, therefore, the invention, as hereinafter disclosed, is applied to an airplane not of the hydroplane type it is nevertheless to be understood that the invention as disclosed is readily adaptable to such use in a hydroplane and, therefore, the invention is not to be limited to the particular adaptation shown.

This invention relates to the combination, construction, arrangement, and relative location of parts, all as will be more fully indicated hereinafter.

Accordingly there is shown in Fig. 1 a side elevational view of an aircraft incorporating the invention;

Fig. 2 is a plan view of the machine of Fig. 1; and

Fig. 3 is a front view in elevation of the construction of the machine of Fig. 1.

Fig. 4 shows a modification of the structure of Figs. 1, 2, 3.

Similar reference characters refer to similar parts throughout the several views of the drawing.

Insofar as the present invention goes, the ailerons, elevators, rudders, tail skid, etc., are similar to those in common use adapted, however, to the special feature of the design hereinafter set forth. The wings 1 and 2, except as to the manner of their support, are of the usual construction. However the shapes and relative association of wings will depend upon the construction and relative size and position of the engines, except that it will probably be found that a crescent shape will generally be preferable as the shape of the lower wing. As shown in Fig. 2 the crescent shape is that corresponding to the intersection of two circular arcs, it is apparent, however, that other curves than circular arcs might be used to give a crescent shape which curves will also yield favorable results.

A special feature of the design is the use of longitudinal trusses which are adapted to make rigid connection with the fuselage 6. By the adoption of this type of construction the wings and fuselage are preserved in relative position under all variations of stresses to which the parts of the airplane may be subjected.

As shown in Figs. 1, 2 and 3 the supporting structure or framework of the aircraft is made up of an upper wing 1, a lower wing 2, joined by the longitudinal truss 3, and held together by the front cross brace structure 4, and a rear cross brace structure 5. These longitudinal trusses are disposed at acute angles to the horizontal axis of the plane and are rigidly connected to both the wings and to the fuselage directly or through the medium of trusses.

Observing Fig. 1 it will be seen that the upper wing is placed at a sufficient elevation above the lower wing and staggered back of it so that the stream flow of the propellers is permitted to act most effectively on the surfaces of the wings. Mounted upon the fuselage 6, are the upper engine 7 and lower engine 8. As shown in Fig. 1 the engines are preferably mounted with the axes of their propeller shafts approximately at right angles to each other. It is, of course, apparent that instead of such mounting, one engine might be mounted upon the fuselage and two other engines—one on either side—might be mounted upon the framework of the airplane to accomplish the same result. When the upper engine is operative the associated propeller draws air from the tops of both wings, thus lessening the pressure thereon. Because of the shape of the lower wing the air is discharged in such a direction that it comes below both wings and thus increases the pressure upon their bottom surfaces, all of these actions tending to lift the aircraft. On the other hand, when the lower engine is in action it causes air to be drawn from the top of the lower wing, thus lessening the pressure upon it and discharges such air against the bottom of the upper wing, thus increasing the pressure on that surface, all of this also tending to lift the airplane. When only one propeller is operating the entire lifting effort is in the direction of its line of thrust. However, when both propellers are operating at the same time the direction of the resultant force will lie somewhere between the two propeller shaft axes and can be varied from the direction of one axis to the direction of the engine's propeller shaft axis in proportion to the relative speeds of the engines, that is the resultant force will lie between the axes of the two propeller shafts, depending upon the relative speeds of the said two engines, and if one of the two engines is not operating the line of said resultant force will naturally be the line of the axis of the engine which is operating.

In order that changes in the quantity of fuel may not seriously disturb the equilibrium of the craft, it is preferred to mount the fuel tank 11 within the fuselage, at or near the center of gravity of the entire structure.

It will be observed in Fig. 1 that when the air plane is resting upon the ground the axis of the upper engine is nearly at right angles with the ground but with a slight forward inclination and in this position almost the entire turning effort of the upper propeller tends to lift the machine at the same time that it gives to the machine a forward impulse. Whereas some forward motion is always necessary in order to enable an airplane to be controlled it has been found that in the structure, as shown, that this would be largely supplied by the lower engine at slow speed. Inasmuch as the disposition of the propellers and engines, as hereinbefore disclosed, operates to decrease the pressure on the upper surface on both wings and increase it on the bottom of said wings it is apparent that the air craft described will require a comparatively short run in taking-off and in landing. It is further apparent that the machine will not require the same speed to be maintained for lift while in the air as is required with machines that depend entirely upon the forward motion of the airplane for their lifting effort. It is also apparent that the wings of this structure, as disclosed, may be made shorter than in existing designs so that the maximum effects of the engine on the wing may be secured by way of operative wing pressures. It has also been found that by locating the wheels 10 of the carriage structure 9 approximately under the longitudinal trusses that a maximum regidity of structure is attained.

It is apparent that in the invention as disclosed the angle of thrust may be varied through a vertical angle with respect to a horizontal axis of the machine. The invention also renders it practical to make the propellers sufficiently large in area to lift a given machine without any great forward motion of the plane. Also in the invention as disclosed the lifting effect due to forward motion is combined with a very large lifting effect due to the direct action of the propellers in adjusting the pressures on the bottoms and tops of the wings. It will also be seen from the disclosure heretofore had that the lifting effect, as disclosed, is caused by either one of the two propellers when operating alone, and still more so when both are operating at the same time. Such lifting of the machine will be helped by the wings and the location of the engines with respect thereto both before the aircraft has any forward motion at all and also after such forward motion has begun. After such forward motion has begun the lifting effort of the wings is an increased lifting effort. At the beginning of the forward motion the large angle of incidence of the wings while the machine is on the ground provides a greater lifting effort for the initial slow motion. Later when the machine "flattens out" as it leaves the ground, the angle of incidence lessens to correspond with the increased speed of forward motion, and the relative speed of the propellers is changed to bring the line of thrust more nearly horizontal. It is, however, apparent that in all directions of the resultant line of thrust the desired effect upon the wings, namely that of reducing the pressure on the top and increasing the pressure on the bottom, is secured. It is apparent too that when the resultant line of thrust is at an angle with the horizontal there is exerted a corresponding direct lift on the aircraft, and this lift may be increased by variation in the angle of thrust caused by varying the speed of either one or both the propellers. As a result of this method of lifting it is clear that the aircraft is capable of alighting and taking off with a considerably less run than is necessary where the line of thrust is parallel to the axis of the craft and, furthermore, because of the means for progressively varying its line of thrust the lift may be regulated in accordance with special conditions without substantially changing the balance or equilibrium of the craft. If desired, the usual camber may be given to the wings in order to increase the lift of the plane, as is well known.

While the specific structure and arrangement thereof have been disclosed it is to be understood that the broad aspect of the invention is capable of application to other structures with equal advantages and effects. Thus, while the engine axes are shown as mounted in such a position that they are almost at a 90° angle with respect to each other, it will be understood that such axes may be so arranged that they make an angle other than 90° with respect to each other. Similarly, while the crescent shaped lower wing is shown as being a product of the intersection of two circular arcs, still it will be understood that arcs other than those of the circle might be used to attain the desired crescent. Although the rudders and fuselage, undercarriage structure, and truss structure shown may be of a specific type, still it will be understood that it is possible to vary these elements along lines well known in the art.

Other changes and modifications will be apparent to those skilled in the art and, therefore, I do not limit myself to a greater extent than is called for by the language contained in the following claims, wherein it is intended to cover all the generic and specific features of the invention herein described. It is further intended that all matter contained in the above description or shown in the accompanying drawing shall be interpreted as illustrative and not in a limiting sense.

Instead of varying the resultant line of thrust of the propellers by varying the speed of the associated motors, a single motor may be employed for both propellers and connected to the motor shaft through suitable gearing. A schematic representation of such an arrangement as shown in Fig. 4 wherein the two propellers 12 and 13 have their shafts connected through suitable gearing to a common drive shaft 14. By suitable mechanism not shown the shaft 14 itself may be rotated about its own axis whereby both propeller structures are moved bodily as a unit so that their resultant line of thrust may be varied. If desired the motor for driving the propellers of Fig. 4 may be mounted on the shaft 14 to turn therewith and may be properly counter-balanced mechanically. It will be obvious that in the embodiment of Fig. 4 a single propeller may be employed, if desired, and its line of thrust varied by turning it bodily about shaft 14.

What I claim as new and useful and desire to secure by United States patent is:

1. In an air-craft machine, an upper wing and a lower wing of continuous crescent shape rigidly connected by longitudinal trusses and held in staggered relation along the longitudinal axis of the machine, propeller structures, and means for varying the resultant thrust of the propellers.

2. In an air-craft structure, a fuselage between two non-overlapped staggered wings one of said wings having a convex forward edge and a concave rear edge, and longitudinal trusses interconnecting the said wings and holding them in rigid spaced relation.

3. In an air-craft structure, an upper wing and a lower wing of continuous crescent shape having its concave edge facing rearwardly of the machine, said wings being staggered along the longitudinal axis of the machine in non-overlapping relation.

4. In an air-craft structure, an upper wing and a lower wing one of said wings having curved forward and rear edges and interconnected by longitudinal trusses holding said wings in predetermined spaced relationship, and an undercarriage disposed beneath and directly supporting said longitudinal trusses.

5. In an air-craft structure, an upper wing, and a lower wing rigidly interconnected by longitudinal trusses, a fuselage supported therebetween, an undercarriage mounted beneath said lower wing directly under said longitudinal trusses, two propellers located with their shafts approximately at an angle of 90°, means for operating one propeller to create a vacuum on the top of the upper wing and a pressure upon the bottom of the upper wing, and means for operating the other propeller to create a suction on top of the lower wing and a pressure upon the bottom of the upper wing.

6. In an air-craft structure, means comprising cross braces in combination with longitudinal trusses substantially as described to support an upper wing and a lower crescent shaped wing longitudinally and transversely, said wings being staggered along the longitudinal axis of the machine in non-overlapping relation.

7. In an air-craft structure having an upper and a lower wing, one of said wings having a convex forward edge and a concave rear edge, two propellers so located and supported on the fuselage, that the lines of thrust of said propellers make a vertical angle with each other and yield a resultant thrust which has a component of forward impulse.

8. In an air-craft structure of the type described having an upper wing and a lower wing of crescent shape, the concave head of which opens rearwardly, and undercarriage structure mounted beneath said lower wings, longitudinal trusses interconnecting said lower wing with said upper wing in staggered relationship and disposed directly over said undercarriage structure, cross trusses adapted to brace said aircraft structure transversely, a fuselage mounted between said longitudinal trusses and between said upper wing and lower wing, two propelling engines mounted so that propeller shafts thereof form an angle of approximately 90°, said engines providing a resultant line of thrust which lies between the axes of the shaft of the propellers, and effective when operating to decrease the pressure upon the upper surfaces of the wings and increase the pressure upon the lower surfaces of said wings.

9. In an aircraft structure, the combination of a pair of wings at different levels and offset with respect to each other along the longitudinal axis of the machine, and means between said wings for creating a suction on the top face of each wing, and simultaneously a pressure on the bottom face of each wing, the last mentioned means including a pair of propellers and means for varying the resultant line of thrust of said propellers.

10. In an aircraft structure the combination of a pair of wings at different levels and staggered along the longitudinal axis of the machine, and a propeller mounted with relation to said wings so as to create a suction on the top of each wing and a pressure on the bottom of each wing, and means for varying the resultant line of thrust of said propeller.

11. In an aircraft machine, means for varying the line of thrust of the machine with relation to an axis of the machine, comprising a pair of non-overlapped wings staggered along the longitudinal axis of the machine, and a pair of propellers with their axes at a fixed angle mounted between said wings and adapted to have their speeds independently controlled to vary the resultant line of thrust.

12. A machine according to claim 11, in which the lower wing has its trailing edge cut away to allow a clear air discharge path for one of said propellers.

13. In an aircraft structure two or more propellers having their lines of thrust fixed at different angles with respect to the vertical, upper and lower wings staggered along the longitudinal axis of the structure, and means for mounting and rotating said propellers so that one propeller creates a suction on the upper surface of one wing and a pressure on the lower surface of said one wing.

14. In an aircraft structure a plurality of propellers, means to vary each or both propeller speeds to vary the resultant thrust, upper and lower wings staggered along the longitudinal axis of the structure, means for mounting said propellers so that during rotation one propeller creates a suction on the upper surface of one wing and a pressure on the lower surface of said one wing.

15. In an aircraft structure having a plurality of propellers mounted at an angle to each other to give a resultant line of thrust which tends to lift the aircraft with a short run and permits of a short run mounting and cooperating upper and lower wing structures staggered along the longitudinal axis of the structure, and means for mounting and rotating said propellers so that each propeller creates a suction on the upper surface of both wings, one of said propellers creating a pressure on the lower surface of both wings.

16. In an aircraft structure having an upper wing and a lower wing, and a plurality of propellers rotatably mounted on axes at an angle to each other and positioned between the planes of said wings so that one propeller upon operation reduces the pressure upon the tops of both wings and increases the pressure on the bottom of both wings, the other of said propellers reducing the pressure on the top of the lower wing and increasing the pressure on the bottom of the upper wing, independently of the forward motion of the machine.

17. In an aircraft structure an upper wing, a lower wing of continuous crescent like shape, longitudinal trusses rigidly connecting said upper and said lower wing to hold said wings in staggered non-overlapping relation, and a pair of independently rotatable propellers mounted between said wings.

GEORGE H. PEGRAM.